United States Patent [19]

Koubek

[11] 4,012,321

[45] Mar. 15, 1977

[54] OXIDATION OF REFRACTORY ORGANICS IN AQUEOUS WASTE STREAMS BY HYDROGEN PEROXIDE AND ULTRAVIOLET LIGHT

[75] Inventor: Edward Koubek, Annapolis, Md.

[73] Assignee: The United States of America as represented by the Secretary of the Navy, Washington, D.C.

[22] Filed: Mar. 25, 1975

[21] Appl. No.: 561,829

[52] U.S. Cl. .......................................... 210/63 R
[51] Int. Cl.² ........................................ C02C 5/04
[58] Field of Search ............... 210/50, 59, 63 R, 64

[56] References Cited

UNITED STATES PATENTS

| 2,070,856 | 2/1937 | Butterfield | 210/63 |
| 2,889,275 | 6/1959 | Moore | 210/63 |
| 3,716,566 | 2/1973 | Sansoni et al. | 210/59 |
| 3,819,516 | 6/1974 | Murchison et al. | 210/63 |

FOREIGN PATENTS OR APPLICATIONS 600,789  6/1960  Canada .......................... 210/63

Primary Examiner—Thomas G. Wyse
Attorney, Agent, or Firm—R. S. Sciascia; A. L. Branning; H. B. Field

[57] ABSTRACT

A predetermined amount of hydrogen peroxide is added to an aqueous waste stream containing organic pollutants, the mixture thoroughly mixed and the resultant mixture irradiated with ultraviolet light. The irradiation by ultraviolet light facilitates the breakdown of the hydrogen peroxide into hydroxyl radicals which are capable of oxidizing virtually any refractory organic compound, thereby reducing the chemical oxygen demand of an aqueous waste stream.

7 Claims, 3 Drawing Figures

OXIDATION OF REFRACTORY ORGANICS IN AQUEOUS WASTE STREAMS BY HYDROGEN PEROXIDE AND ULTRAVIOLET LIGHT

BACKGROUND OF THE INVENTION

In the field of water pollution, the potential quantity or amount of pollution that a substance may cause is commonly stated in terms of the effect it would have upon the dissolved oxygen in a body of water or aqueous stream. The more dissolved oxygen that would react with the matter to completely oxidize it, the higher its chemical oxygen demand (COD). The higher the COD, the more such matter is regarded as a pollutant because as more dissolved oxygen is consumed in oxidation reactions with oxygen demanding matter, the less there is remaining to support aquatic plant and fish life. Hence, acceptable pollution levels are stated in terms of the COD of the body of water or stream being monitored and the concentrations of bacteria, virus, and other undesirable germs and micro-organisms.

Conventional pollution control technology at present is separated into various categories or stages of treatment known as primary, secondary and tertiary. Primary treatment is initially by means of a relatively inexpensive process which should effectively oxidize and thereby eliminate a relatively large percentage of such compounds. Compounds which are refractory and remain relatively uneffected by the primary treatment are then oxidized by secondary and tertiary treatments which are more expensive per unit of unoxidized compound than the primary treatment, but effectively oxidize the refractory compounds. Thus, a savings is effected without sacrificing overall treatment efficiency by first using a relatively low cost per unit of COD method on the raw, untreated waste steam, and then oxidizing the remaining, refractory compounds with a relatively higher cost but more efficacious method or methods.

One conventional primary treatment well known in the art is comprised of feeding the waste stream into aerated setting ponds where bacteria which feed on the waste products will metabalize the compounds, thereby eliminating much of their COD.

There are several considerations, however, which indicate that this treatment method is less than perfect. The bacteria which feed on and break up the oxygen demanding compounds multiply rapidly but eventually die and then they require dissolved oxygen to oxidize their remains, thus replacing a portion of the oxygen demand that has been used to eliminate them. In order to overcome this problem, as well as safeguard against any adverse health effects a significant amount of such bacteria might cause, it is common practice to kill the bacteria as well as any other undesirable micro-organisms prior to the discharge of the treated aqueous waste by adding chlorine. Though the chlorine will effectively sanitize the discharged aqueous waste, it will also form compounds with various hydrocarbon compounds found in the treated waste stream as well as in the body of water or stream into which the chlorine-treated waste is discharged. Recent laboratory experiments strongly suggest that a wide variety of such chlorinated compounds may cause cancer in humans when taken internally. Furthermore, the foregoing known process is unsuitable for use aboard a naval vessel because space and treatment time requirements are incompatible with the shipboard constraints with respect to these variables.

The wet oxidation process is another primary treatment known in the art, but has an advantage over the previously discussed bacteriological process in that, though it may be used on dry land, it is also acceptable for use aboard a naval vessel. Essentially the process oxidizes the waste compounds by forcing compressed air through heated aqueous waste that is contained in a pressurized vessel, thus facilitating an oxidation reaction between the waste compounds and the oxygen in said compressed air.

However, it has been determined that acetic acid (or acetate), an organic compound, is one of the last residual organic compounds to be oxidized whenever the aqueous waste stream containing human excrement is oxidized. Thus, this primary treatment process as was the case with the one previously discussed herein, is unable to significantly reduce the COD caused by acetic acid when operated at its respective nominal efficiency modes. It is known that the efficiency of the wet oxidation process may be increased by increasing its operating temperature, i.e. the temperature to which the pressurized aqueous waste is heated and maintained, and that operation in such a mode will enable the oxidation of acetic acid to occur. However, the concomitant increase in operating pressure would more than likely require the structural modification of existing facilities, and the construction of a facility possessing the capability to operate at the high efficiency mode would be more expensive than one built to withstand only nominal efficiency operating pressures. In addition, the high efficiency mode is unacceptable for use aboard a naval vessel due to space, weight, and power constraints.

Reverse osmosis may be employed as a secondary treatment to eliminate virtually any refractory organic from an aqueous waste stream. The process involves forcing the waste stream through a semipermeable membrane, said membrane being impermeable to any or all of the refractory organic pollutants. The process will thereby separate the polluting compounds from the waste stream but, though it provides for their collection, their ultimate disposal remains a problem, i.e., the pollutants are not oxidized into non-oxygen demanding compounds such as $CO_2$ and $H_2O$. The membrane will also require periodic cleansing in order to operate efficiently. Standby procedures must also be considered to prevent the discharge of untreated waste in the event that the membrane suffers a rupture from the application of excessive pressure. Thus, time and power requirements, as well as potential maintenance problems, may make this process unattractive for use abroad a naval vessel.

For background purposes, air oxidation or organic compounds is believed to follow the initiation step:

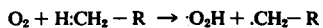

where R represents a carbon based organic molecule or chain. Acetic acid,

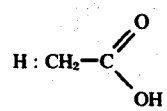

is relatively more resistive to this initiation step than other organic compounds, and, therefore, to further oxidation because the inductive effect of the —$CO_2H$ group makes the initial hydrogen atom abstraction more difficult. In order to accomplish the initiation step, the relatively strong force between the H proton and its electron and the C nucleus caused by the inductive effect must be overcome by an oxidizing agent which has the power to abstract the H atom (H·). It is known to those experienced in the chemical arts that the hydroxyl radical, noted as ·OH, is a more reactive species than $O_2$. It is also known that ·OH has the requiste chemical reactivity necessary to abstract the H atom from the carbon atom on acetic acid.

It is known that ·OH may be generated by mixing $H_2O_2$ with Fenton type reagents such as $Fe^{2+}$ or $Cu^{2+}$, for example:

$$Fe^{2+} + H_2O_2 \rightarrow Fe^{3+} + OH^- + \cdot OH$$
$$Fe^{3+} + H_2O_2 \rightarrow Fe^{2+} + H^+ + \cdot O_2H$$

Thus, it appears that acetic or virtually any oxygen demanding organic may be oxidized by adding appropriate proportions of $H_2O_2$ and a Fenton type reagent. However, other reactions in the decomposition mechanism compete with the organic pollutants for the available active oxidant in the $H_2O_2$, and thereby render a portion of the theoretical oxidizing potential of the $H_2O_2$ unavailable for oxidizing organic pollutants.

$$Fe^{2+} + \cdot OH \rightarrow Fe^{3+} + OH^-$$
$$HO_2 \cdot \rightleftarrows O_2^- + H^+$$
$$Fe^{3+} + O_2^- \rightarrow Fe^{2+} + O_2$$
$$H_2O_2 + \cdot OH \rightarrow HO_2 \cdot + H_2O$$

The practical applicability of this last method is significantly limited by the fact that it will function and effectively remove COD only for pH between 3 and 5.

In addition, should the ferrous or ferric ion be used as the metallic ion catalyst, a portion of the metallic ions will eventually form iron oxide, commonly known as rust. It follows that any body of water into which the treated waste stream containing the ferrous or ferric ion is discharged will suffer discoloration from the iron oxide in solution; the surface of any solid object coming into contact with such water and causing the iron oxide to come out solution will also suffer discoloration.

SUMMARY OF INVENTION

The treatment method of the present invention effectively oxidizes all known refractory organic compounds except fluorinated hydrocarbons, eliminating their COD by reacting with the polluting compound to cause its ultimate destruction into non-oxygen demanding compounds, i.e., $CO_2$ and $H_2O$. In general, this is done by the use of hydrogen peroxide and ultraviolet light reacting with each other and acting simultaneously on the aqueous waste body containing the pollutants.

The present invention may conveniently and efficiently be used as secondary treatment in conjunction with any known primary treatment without requiring the modification of the primary treatment's nominal operational mode or physical facility. Its operating characterists are such that its use may be compatible with the time, space, and power constraints of a naval vessel or shore based installation.

Concomitant with eliminating refractory organics, the treatment by the present process will kill bacteria, virus, germs, and other undesirable micro-organisms carried by the waste stream without requiring the addition of the suspected carcinogen chlorine provided the irradiation is of adequate intensity and duration.

Applicant's method of treatment essentially creates ·OH from $H_2O_2$ added to the waste stream. The subsequent oxidation of the refractory organic is accomplished due to the relatively high oxidation power of the generated ·OH as previously explained in the discussion concerning the prior art metallic-ion method. However, the treatment method of the invention generates the desired ·OH without concomitant ancillary reactions that render an appreciable portion of the theoretical oxidation potential of the added $H_2O_2$ unavailable for oxidizing the refractory organics. Among the advantages of the present invention are: As direct consequences of the relative efficiency in the use of $H_2O_2$, the treatment requires less per gallon of treated aqueous waste than the metallic-ion method and therefore is lower in cost. The method functions efficiently over a wider pH range, in contrast to the restrictive pH 3 to 5 range of the metallic-ion method. The esthetically offensive discoloration of the water due to the formation of iron oxide when an iron salt is used in the metallic ion method cannot occur when the invention is used because, outside of the oxidizing agent $H_2O_2$, no additioned foreign substance is added to the waste stream. The process requires negligible maintenance and human operational supervision. The risk of malfunction is nil. Also, the invention is particularly useful aboard a seagoing vessel where space is limited and as well as an dry land, where time and space constraints are significant.

An object of the invention is to oxidize any and all organic compounds typically found in waste stream or other aqueous body including those organic compounds which have heretofore proven highly resistant to oxidation by conventional treatment methods.

Another object of the invention is to achieve such oxidation in a manner which is simple to operate, requires very little human operational supervision and maintenance, and is extremely effective.

The treatment method of the present invention is compatible with any primary treatment it is used in conjunction with without requiring modification of such primary treatment's normal operating mode and functions to effectively and efficiently oxidize any refractory organics surviving any such primary treatment.

The invention provides for the ultimate disposal of oxygen demanding organics by oxidizing them into $CO_2$ and $H_2O$. Concomitant with the aforementioned oxidation process, the waste stream is sterilized so as to destroy all bacteria, virus, germs, and other undesirable micro-organisms without the addition of the suspected carcinogen producing chlorine.

BRIEF DESCRIPTION OF DRAWINGS

A more detailed description of the invention follows in conjunction with a drawing wherein.

DETAILED DESCRIPTION

Figure 1:
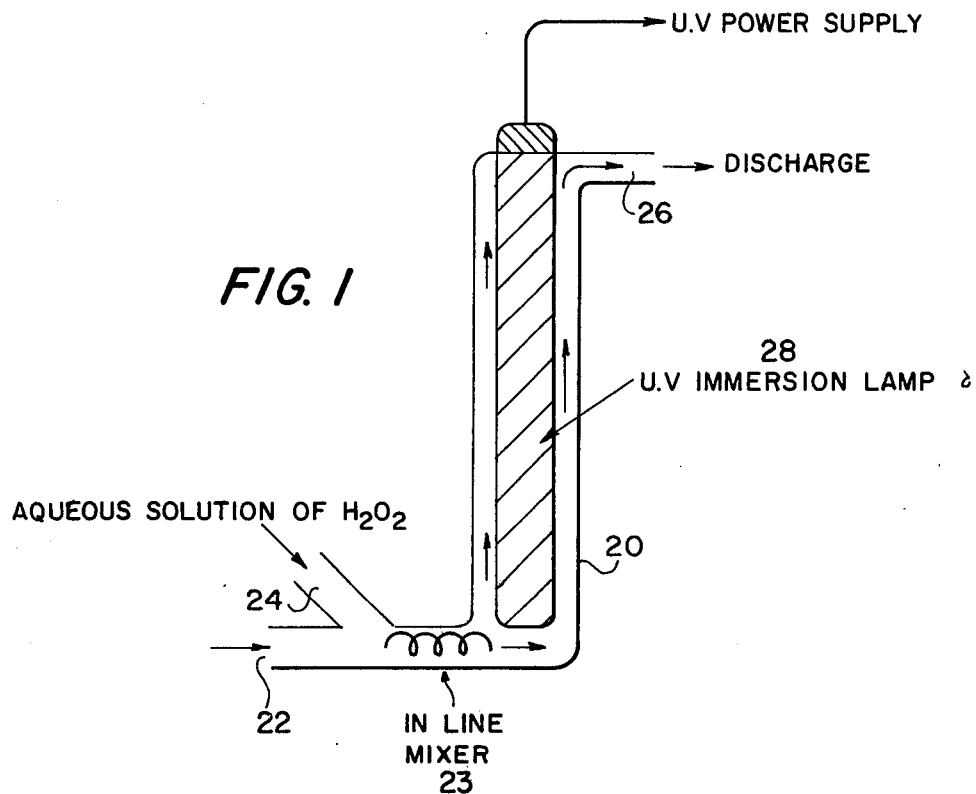
FIG. 1 schematically illustrates the operation of the present invention.

Referring to FIG. 1 there is shown, by way of illustration only and not be way of limitation, apparatus for achieving the results of the invention. A container 20 is supplied with the waste stream containing the pollutants by conduit 22 (under pressure if necessary) located at one end of the bottom of the container. After measuring the chemical oxygen demand of the waste stream by any standard method an aqueous solution of $H_2O_2$ is supplied under pressure to conduit 24 which joins conduit 22 slightly downstream. An in-line mixer or agitator 23 throughly mixes the $H_2O_2$ into the waste stream and the resultant mixture is passed through the container in the direction of the arrows to eventual discharge by means of conduit 26. An ultraviolet (UV) lamp 28 is immersed in the flowing waste stream. The UV light dissociates the $H_2O_2$ into the desired oxidization agent .OH which subsequently achieves the desired oxidation of the refractory organic pollutants into non-oxygen demanding compounds, $CO_2$ and $H_2O$.

It is assumed that except for special situations the waste stream been partially treated by a conventional primary treatment process before in appears at location 2 on conduit 22 as the stream advances to the in-line mixer 23. The COD of the stream is measured at this point, and the required amount of $H_2O_2$ to be added is calculated.

The required amount of $H_2O_2$ is then added to the waste stream in an aqueous solution at location 4 and the stream passed through the container 20 in the direction of the arrows for discharge into conduit 26.

Between the line mixture and the discharge conduit the mixture in the waste stream is irradiated by the ultraviolet lamp 28 immersed in the advancing stream. The ultraviolet irradiation causes the formation of ·OH radicals from the $H_2O_2$, which subsequently oxidize the refractory organics to form $H_2O$ and $CO_2$. The irradiation and ·OH also kills all of the bacteria, virus, and germs carried by the waste stream. The oxidized and sanitized waste stream is discharged from conduit 26 into a natural stream or body of water.

As a result of this treatment by the invention the COD in a waste stream caused by organic compounds is substantially reduced or eliminated by oxidation to $H_2O$ and $CO_2$ and the bacteria, virus, and germs in the waste stream are also destroyed without using chlorine.

Many organic compounds are susceptible to oxidization by more economical primary treatment methods. However, research has indicated that such methods are unable to oxidize certain compounds such as acetic acid (or acetate) and phenols at acceptable operating temperatures and pressures. Thus, it is of significant importance that the treatment by the invention is able to oxidize virtually any refractory organic compound, including acetic acid and phenols.

This amount of dissolved molecular oxygen required to oxidize acetic acid may be calculated according to the equation $$2 O_2 + CH_3 CO_2H \rightarrow 2 CO_2 + 2 H_2O$$

The process requires an amount of $H_2O_2$ to oxidize the same amount of oxygen demanding organic according to the equation $$4 H_2 O_2 + CH_3 CO_2H \rightarrow 2 CO_2 + 6 H_2O$$

Thus, the relationship between the required amount of $H_2O_2$ and COD is given by the ratio of required $H_2O_2$ to dissolved $O_2$, where each oxidize the same amount of oxygen demanding organic:

$$\frac{4 \text{ moles } H_2 O_2}{2 \text{ moles } O_2} = 2.1 \frac{\text{grams of } H_2O_2}{\text{grams of COD}}$$

Thus, the amount of $H_2O_2$ required to effectively eliminate the COD in the waste stream will vary in proportion to the COD of the stream as measured immediately upstream of the point at which the $H_2O_2$ is to be added.

The $H_2O_2$ should be uniformly dispersed throughout the waste stream to reduce the probability that any .OH radicals subsequently formed will react with each other and thereby reduce the oxidizing potential of the added $H_2O_2$.

As any thermal energy transmitted by the waste stream to the $H_2O_2$ bonds that would facilitate their cleavage is insignificant in comparison to the energy supplied by the ultraviolet light, the rate and efficiency of the .OH radical formation and the subsequent oxidation of the refractory organic molecules will not be appreciably effected by the stream temperature under normal operating conditions (0° – 50° C). However, at higher temperatures this energy may become a significant contributing factor. The process of the invention can be practiced at higher temperatures but the hardware required to maintain these higher temperatures and accompanying pressures will add to the overall cost.

The production of .OH radicals from $H_2O_2$ will occur upon irradiation from an ultraviolet light source of a wavelength of or less than 2600 angstroms. The wavelength below 2600 angstroms may vary over the widest possible range depending upon the energy of the irradiating source. The formation of .OH radicals and, hence, the oxidation of the refractory organics, will vary with light intensity which varies with the average distance between the ultraviolet light source and the $H_2O_2$ molecules in the waste stream, the wavelength of the ultraviolet light, and the total number of impacting photons. This relationship may be expressed as, Reduction of

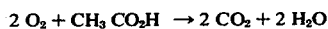

where
N = total number of impacting photons
C = speed of light
h = Planck's constant
λ = wavelength of the ultraviolet light
R = average distance traveled by photon As N = g (t), where t = time of exposure to the ultraviolet radiation, the expression for reduction may also be expressed as

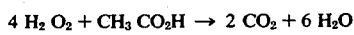

where n = number of photons impacting per unit of time. Light is commonly expressed in terms of intensity, I, where I =

$$f_3\left(\frac{nch}{\lambda R^3}\right)$$

per unit of time, the reduction of COD may alternatively be expressed as $$f_3\left(\frac{nch}{\lambda R^3}\right) \cdot g(t)$$

This relationship has been empirically determined through experimentation. The results are shown plotted in FIG. 2.

The calculations disclosed in the immediate application assume that the waste stream does not contain metallic ions. As previously explained herein, $H_2O_2$ will dissociate to form .OH in the presence of such ions and the .OH molecules will proceed to oxidize the refractory organics. However, as the .OH molecules will also react with the metallic ion catalysts, this mechanism of oxidizing the refractory organics is less efficient than the method of the invention and therefore the presence of certain metal ions in the waste stream will cause the efficiency of the present treatment process to suffer.

As the rate and total reduction of COD is directly limited by the amount of .OH present to oxidize the refractory organic molecules, it is recommended that somewhat more than the stochiometrically calculated amount of $H_2O_2$ per gram of COD be added to the waste stream, e.g. $[H_2O_2]/[COD] \approx 2.3$ to ensure the presence of an adequate amount of .OH reactants to achieve the desired reduction in COD. The requisite number of grams (mass) of $H_2O_2$ equals approximately 2.3 times the concentration of COD in grams per liter (mass per volume) times the number of liters of waste water to be treated, but no less than 2.1.

Table II $I_o = 4 \times 10^{-4}$ einsteins/liter-min, Temp. 25° C.

| Time (min) | Concentration $H_2O_2$ | Conc Acetic Acid | COD |
|---|---|---|---|
| 0 | 0.54 Molar | 0.125 Molar | 4.00 g. |
| 20 | 0.31 | 0.077 | 2.46 |
| 40 | 0.16 | 0.040 | 1.28 |
| 60 | 0.08 | 0.020 | 0.64 |

Table III $I_o = 2 \times 10^{-4}$ einsteins/liter-min, Temp. 25° C.

| Time (min.) | Conc. $H_2O_2$ | Conc. Acetic Acid | COD |
|---|---|---|---|
| 0 | 0.54 Molar | 0.125 Molar | 4.00 g. |
| 20 | 0.42 | 0.105 | 3.30 |
| 40 | 0.31 | 0.077 | 2.46 |
| 60 | 0.22 | 0.056 | 1.80 |
| 80 | 0.17 | 0.042 | 1.35 |
| 100 | 0.12 | 0.030 | 0.96 |

Figure 3:
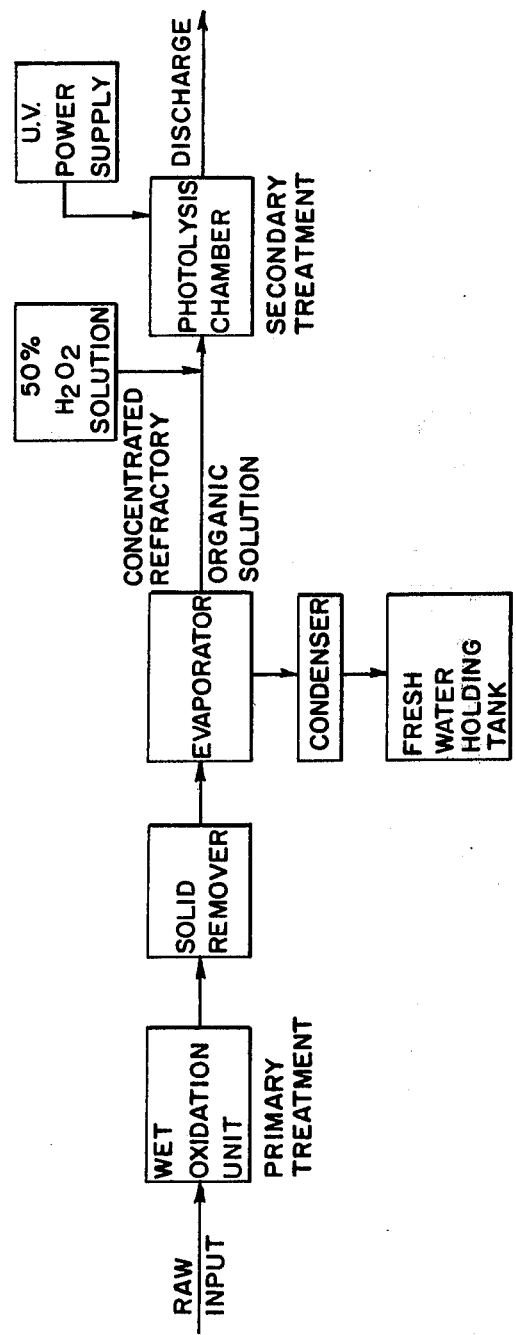
FIG. 3 illustrates the manner in which the method of the present invention may compatibly be used in conjunction with a known primary treatment.

FIG. 3 shows how a flow or batch waste treatment system utilizing photochemically induced oxidation by hydrogen peroxide according to the invention may be used as a secondary treatment method.

The specific apparatus of FIG. 1 is merely presented for the purpose of illustration. In it, the waste water is in a flowing stream and may be treated while flowing. It should be noted, however, that the invention may be employed to treat an agitated body of water. Such a treatment would involve the same treatment steps regarding ascertaining the COD, adding and throughly mixing in the required amount of $H_2O_2$, and irradiating the mixture with U. V. light. Stated another way, the fundamental teachings of the invention do not necessarily involve a stream or flow situation.

The process of the invention is especially useful where the waste body to be treated contains human excrement. The size of the container for the waste body depends on the amount of waste to be treated. A small unit as represented in FIG. 1 may be 6 feet long by 2 inches in diameter. It is not essential that the UV light source be immersed in the waste body. A highly light reflecting surface concentrating the UV light over the Table I Data Obtained on $H_2O_2$ - Acetic Acid/Acetate Reaction Initiated by U. V. Light. Temperature 25° C

| Reactants | Reaction Time | % Removal of Acetic Acid-Acetate | %$H_2O_2$ remaining | Ratio-$O_2$ $CO_2$ |
|---|---|---|---|---|
| Acetic acid + $H_2O_2$ | 20 | 35 | 45% | .87 |
| Ammonium acetate + $H_2O_2$ | 20 | 72 | 37% | .14 |
|  | 45 | >95 | 4% | .12 |
| Ammonium acetate | 20 | 0 | — | — |
| Ammonium acetate + $O_2$* | 20 | 0 | — | — |
| Sodium acetate + $H_2O_2$ | 30 | 93 | 8% | .14 |
| Sodium monochloro-acetate + $H_2O_2$ | 20 | 84 | 7% | .07** |
| Sodium trichloro-acetate + $H_2O_2$ | 45 | 60 | 0 | 2.4 |

*$O_2$ bubbled in at 1 atm.
**No $Cl_2$ or chloride containing product found other than $Cl^-$
Note: Data is average of at least two experiments. U. V. light was from a Hg. vapor source. Initial atmosphere, 14cm. Ar.

Figure 2:
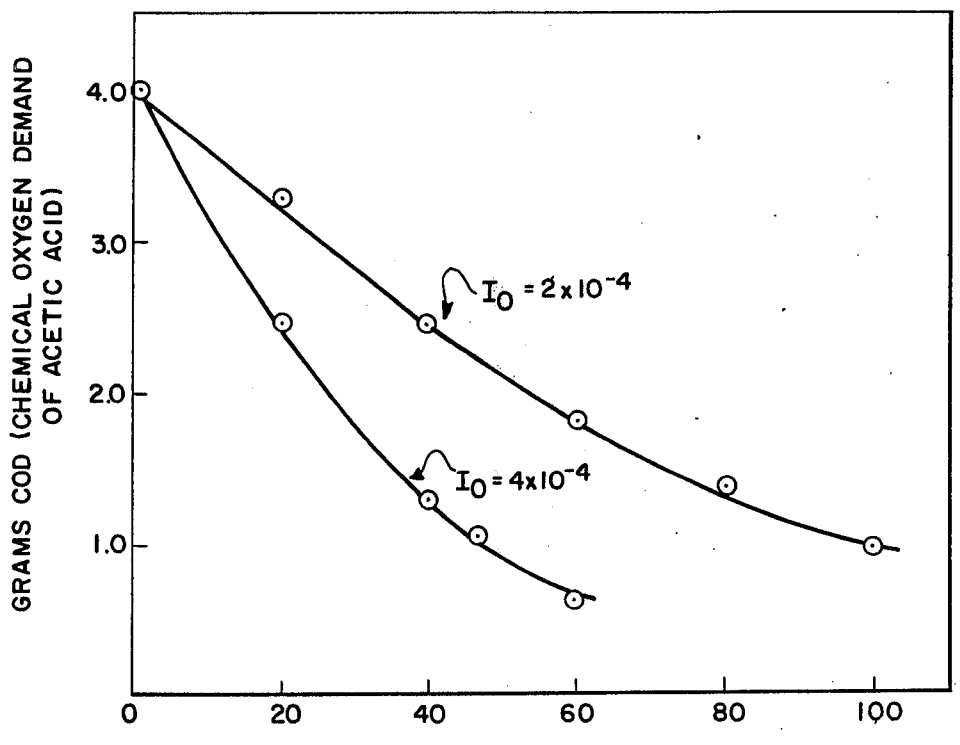
FIG. 2 graphically illustrates the inter-relationship of the operational variables such as the intensity of the ultraviolet light, the duration of the irradiation by said light, and the consequent reduction in the COD in the treated body of water.

FIG. 2 and Table II and III shows how the chemical oxygen demand (COD) of an acetate solution changes with time and UV light intensity $I_o$. These solutions were initially 0.54 molar in hydrogen peroxide and 0.125 molar in sodium acetate.

length of one or more light sources toward the waste body to be treated will also be effective.

Obviously, many modifications and variations of the present invention are possible in light of the above teachings. It is therefore to be understood that, within the scope of the appended claims, the invention may be practiced otherwise than as specifically described.

What is claimed is:

1. A method for lowering the chemical oxygen demand (COD) of an aqueous waste body, consisting essentially of
    measuring the COD of said aqueous waste body;
    adding an aqueous solution of hydrogen peroxide to said aqueous waste body, wherein the requisite number of grams of hydrogen peroxide equals no less than 2.1 times said measured chemical oxygen demand;
    agitating said aqueous waste body and hydrogen peroxide;
    flowing said aqueous waste body and hydrogen peroxide through a container; and
    irradiating said aqueous waste body and said hydrogen peroxide as it flows through said container with ultraviolet light at a wavelength no greater than 2600 Angstroms.

2. A method as defined in claim 1, wherein said aqueous waste body flows through a first conduit.

3. A method as defined in claim 2, wherein said hydrogen peroxide is added to said aqueous waste body through a second conduit.

4. A method as defined in claim 1, wherein said aqueous waste body has a temperature between 0° and 50° C.

5. A method as defined in claim 1, wherein said ultraviolet light is disposed within said container so that said aqueous waste body and said hydrogen peroxide flows around and past said ultraviolet light.

6. A method as defined in claim 1, wherein said aqueous waste body is pressurized.

7. A method as defined in claim 6, wherein the addition of said aqueous solution of hydrogen peroxide to said aqueous waste body is done under pressure.

* * * * *